(12) United States Patent
Greiwe (10) Patent No.: US 7,654,190 B2
(45) Date of Patent: Feb. 2, 2010

(54) DISPENSING DEVICE FOR DRINKS

(75) Inventor: Hansdieter Greiwe, Boxberg (DE)

(73) Assignee: Niro-Plan AG, Aarburg (CH)

( * ) Notice: Subject to any disclaimer, the term of this patent is extended or adjusted under 35 U.S.C. 154(b) by 759 days.

(21) Appl. No.: 10/525,866

(22) PCT Filed: Aug. 28, 2003

(86) PCT No.: PCT/EP03/09559

§ 371 (c)(1),
(2), (4) Date: Sep. 19, 2005

(87) PCT Pub. No.: WO2004/023950

PCT Pub. Date: Mar. 25, 2004

(65) Prior Publication Data

US 2006/0174778 A1    Aug. 10, 2006

(30) Foreign Application Priority Data

Aug. 28, 2002  (DE)  ................. 102 39 594

(51) Int. Cl.
*A47J 31/60* (2006.01)
*B67D 1/08* (2006.01)

(52) U.S. Cl. .................. 99/275; 99/290; 99/323.3; 222/148; 222/330

(58) Field of Classification Search ............ 99/275, 99/279, 290, 293, 300, 323.1, 323.3; 222/148, 222/330; 141/90, 91, 92; 134/166 R, 171, 134/166 C See application file for complete search history.

(56) References Cited

U.S. PATENT DOCUMENTS

| 4,098,175 A | 7/1978 | Fierz |
| 4,465,210 A | 8/1984 | Iwanami |
| 5,810,059 A * | 9/1998 | Rutter et al. ........... 141/92 |

FOREIGN PATENT DOCUMENTS

| CH | 665 945 A5 | 6/1988 |
| DE | 295 19 410 U1 | 1/1996 |
| DE | 195 49 227 A1 | 7/1997 |
| GB | 2 031 378 A | 4/1980 |

* cited by examiner

*Primary Examiner*—Reginald L Alexander
(74) *Attorney, Agent, or Firm*—Merchant & Gould P.C.

(57) ABSTRACT

Many kinds of dispensing devices for drinks or similar fluid foodstuffs, especially for coffee and/or milk are already known. Said devices comprise supply means for supplying at least two different hot drinks, filling outlets for dispensing hot drinks into at least one cup and valve means for stopping and releasing drink pipelines between the supply devices and the filling devices. According to the invention, in order to improve hygiene and product quality, the valve means are embodied in such a manner that additional pipelines for supplying and/or discharging flushing agents for cleaning, hot water or steam for preheating or other similar fluids, can be connected to the valve means instead of to the drinks pipelines in order to treat the valve means in the areas through which hot drinks flow. As a result, a rinsing process can be automatically controlled between two dispensing steps.

6 Claims, 11 Drawing Sheets

DISPENSING DEVICE FOR DRINKS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The invention relates to a dispensing device for drinks or similar dosable liquid foodstuffs, in particular for coffee and/or milk or similar hot drinks.

BACKGROUND OF THE INVENTION

Dispensing devices of this kind are known in many forms. They are used not only in self-service restaurants and canteens, but also in normal hotels and the like, with the result that fewer service personnel are needed behind the counter.

So that on one hand several different drinks, or also mixed drinks, can be dispensed while on the other hand it is not necessary to employ a large number of "specialized" dispensing devices, dispensing devices are designed so that they can be switched into different modes. However, this involves many problems, which in particular are solved by the various valve mechanisms that are needed. For one thing, it turns out that long pipelines are needed, which especially where hot drinks are dispensed is disadvantageous when the dispensing device is not used continuously but rather at intervals, so that cooling effects become noticeable. For another, considerable hygiene-related problems arise, requiring laborious cleaning work that must performed by hand, which is seriously inconvenient where the operation is organized in shifts.

Hence it is the object of the invention to provide a dispensing device that enables correct operation of the dispensing device by simple means, with relatively little labor.

BRIEF SUMMARY OF THE INVENTION

This object is achieved by a dispensing device for drinks or similar dosable liquid foodstuffs, in particular for coffee and/or milk or similar hot drinks, in accordance with the present invention and comprising a supply means adapted to supply at least two different hot drinks; filling outlets adapted to dispense a hot drink into at least one container; drink pipelines connecting the supply means to the filling outlets; accessory pipelines for supplying and carrying away an accessory fluid in the form of at least one of flushing agents for cleaning, hot water or steam for prewarming, or other similar fluid; and valve means for stopping and opening said drink pipelines between the supply means and the filling outlets, and adapted to connect said accessory pipelines to the valve means instead of the drink pipelines, in order to treat the valve means in the regions through which the hot drinks flow.

The aim of the invention is that the conduits through which the hot drinks flow, and which are emptied after a dispensing procedure, can be rinsed automatically, i.e. without manually positioning containers to collect the rinse water or connecting tubes to carry that water. As a result, not only is an optimum achieved from a hygienic viewpoint, but also the channels in which the hot drinks run can be warmed before a drink is dispensed. In this way two things can be ensured: optimal servicing of the dispensing device, of value in particular to the manager, and optimal quality of the drinks for the customer.

In an especially preferred embodiment of the invention the valve means comprise at least one sliding element that can be moved by a motor and incorporates at least two channels, each of which is associated with at least one particular mode of operation for dispensing the hot drink when in a first position, and when in a second position is connected to the accessory pipeline. By means of such a sliding element, which preferably is constructed as rotary disks, the number and size of "dead spots" (sites inaccessible by rinsing) can be reduced. Moreover, a particularly high degree of variability of the supply and drainage pipelines becomes possible, so that a large number of supply means can be connected to a large number of filling outlets, in various combinations.

The filling outlets are preferably disposed directly adjacent to the sliding element, so as to ensure extremely short pathways between the valves formed by the sliding element and the filling outlets. This, in turn, optimizes the hygienic and qualitative properties of the dispensing device. Preferably two or more sliding elements are provided, containing channels such that two or more hot drinks can be sent to the same filling outlet, either simultaneously or sequentially, as desired. This increases the versatility of the dispensing device.

The filling outlets are preferably provided with at least two flow channels, separated in such a way that the hot drinks flowing through the separate channels are not mixed until they have left the filling outlets, i.e. mixing first occurs substantially within the container. As a result it is possible to ensure an optimal consistency of the drinks, e.g. in the case of cappuccino or latte macchiato.

The channels are preferably connected to one another in such a way that the accessory fluid can be sent through several channels at the same time. Thus in a single rinsing (or prewarming) process several channels can be rinsed simultaneously, which results in a minimization of costs and also an acceleration of the work involved.

Preferably a single accessory pipeline is provided to drain the accessory fluid away, such that the accessory fluid can be sent through the drink pipelines and the drink pipelines can be blocked off directly ahead (in the direction of flow) of the inflow openings for the accessory fluid). Hence the accessory fluid can be admitted to the system either directly at the slider or—as indicated here—upstream of these valve means, substantially immediately after the point in the supply means at which their first dispensing valve is located. This enables optimal cleaning of the complete set of pipelines used for foodstuffs.

Preferably control means are provided and so designed that after a (each) drinks-dispensing procedure a rinsing procedure is carried out. As a result, hygiene is maximized.

Preferred embodiments of the invention will be described by way of example with reference to the accompanying drawings.

DETAILED DESCRIPTION OF THE INVENTION

In the following description, the same reference numerals are used for identical parts or parts with identical actions.

It should be noted that although the example of a coffee machine shown here is designed to dispense coffee/espresso and milk, it will be clearly evident to a person skilled in the art that the construction shown in principle here can be modified in many ways, in particular for dispensing a greater variety of "drinks" or also other liquid foodstuffs. Therefore when in the following reference is always made to "coffee" and "milk", this does not restrict the invention to these kinds of drinks. "Coffee" is here intended also to denote in particular espresso, which together with milk and, where appropriate, a foaming means, can be further processed as espresso or latte macchiato.

Figure 1:
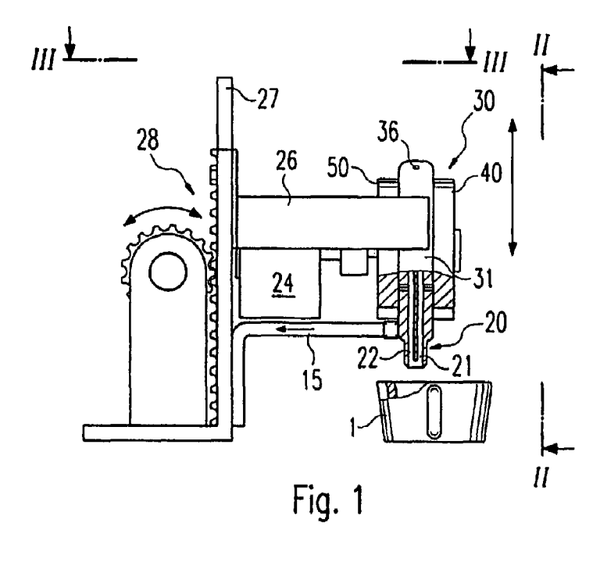
FIG. 1 is a side view of part of a dispensing device, partly in section.
Figure 2:
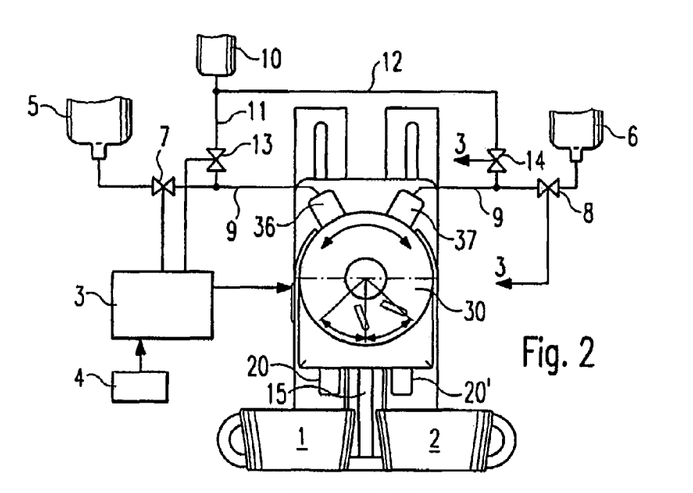
FIG. 2 is a view along the line II-II in FIG. 1.
Figure 3:
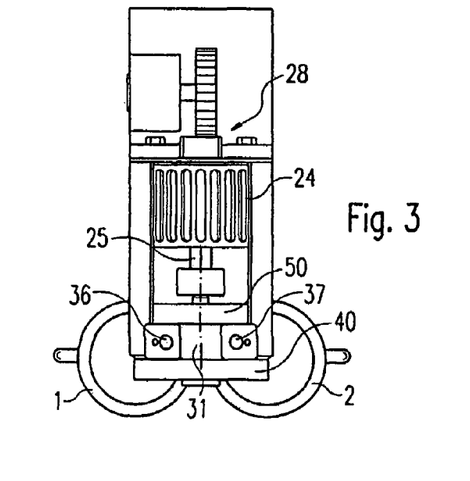
FIG. 3 is a view along the line III-III in FIG. 1.

FIG. 1 shows a major element of a dispensing device in a (partially sectioned) side view; the same device is shown again in FIGS. 2 and 3, in front view together with control elements and in plan view, respectively.

According to FIGS. 1 to 3, the dispensing device comprises a stationary stand 27 to which is attached, by way of a valve holder 26, a valve means 30 that comprises an outflow block 31 fixed to the valve holder 26; disposed on a first and a second side of the outflow block are a first rotary disk 40 and a second rotary disk 50, respectively. To the outflow block 31 are attached filling outlets 20, 20', below which containers 1, 2 can be placed. Each of the filling outlets 20, 20' comprises a first flow channel 21 and a second flow channel 22, which are each connected to a channel in the outflow block 31 and which join one another at the very end of the filling outlet 20, 20', i.e. just above the container 1, 2.

The two disks 40, 50 are mounted on the shaft 25 and can be rotated together by a motor 24.

The entire arrangement that is fixed to the valve holder 26 can be moved up and down by a vertical drive mechanism 28, to ensure that the filling outlets 20, 20' can be adjusted so that no splashes are caused during the dispensing process, and optimal mixing/filling is produced. On the outflow block 31 are a first inlet 36 and a second inlet 37, which are connected to a first supply means 5 (in this case for espresso or coffee) and a second supply means 6 (in this case for milk), by way of drink pipelines 9 and valves 7, 8. Into the drink pipelines 9 open a first accessory pipeline 11 and a second accessory pipeline 12, by way of a first accessory valve 13 and a second accessory valve 14; these pipelines carry an accessory fluid from an accessory-fluid supply 10, which provides water, steam, a flushing agent or a mixture thereof. The valves 7, 8, 13, 14 and the motor 24 to adjust the valve means 30 are controlled by a controller 3, which can be operated by way of a keyboard 4. The controller 3 contains control programs for setting the valves or the valve means 30, with its rotary disks 40 and 50; these programs are stored in programmable memory areas or else in permanently preprogrammed memory, in which case the programming is done by the manufacturer of the dispensing device. The programs are such that when a request for a particular drink is input by way of the keyboard 4, the valves or valve means are set appropriately for that drink, and the desired drinks flow through the pipelines for a particular period of time, in order to dispense a predetermined amount.

Figure 4:
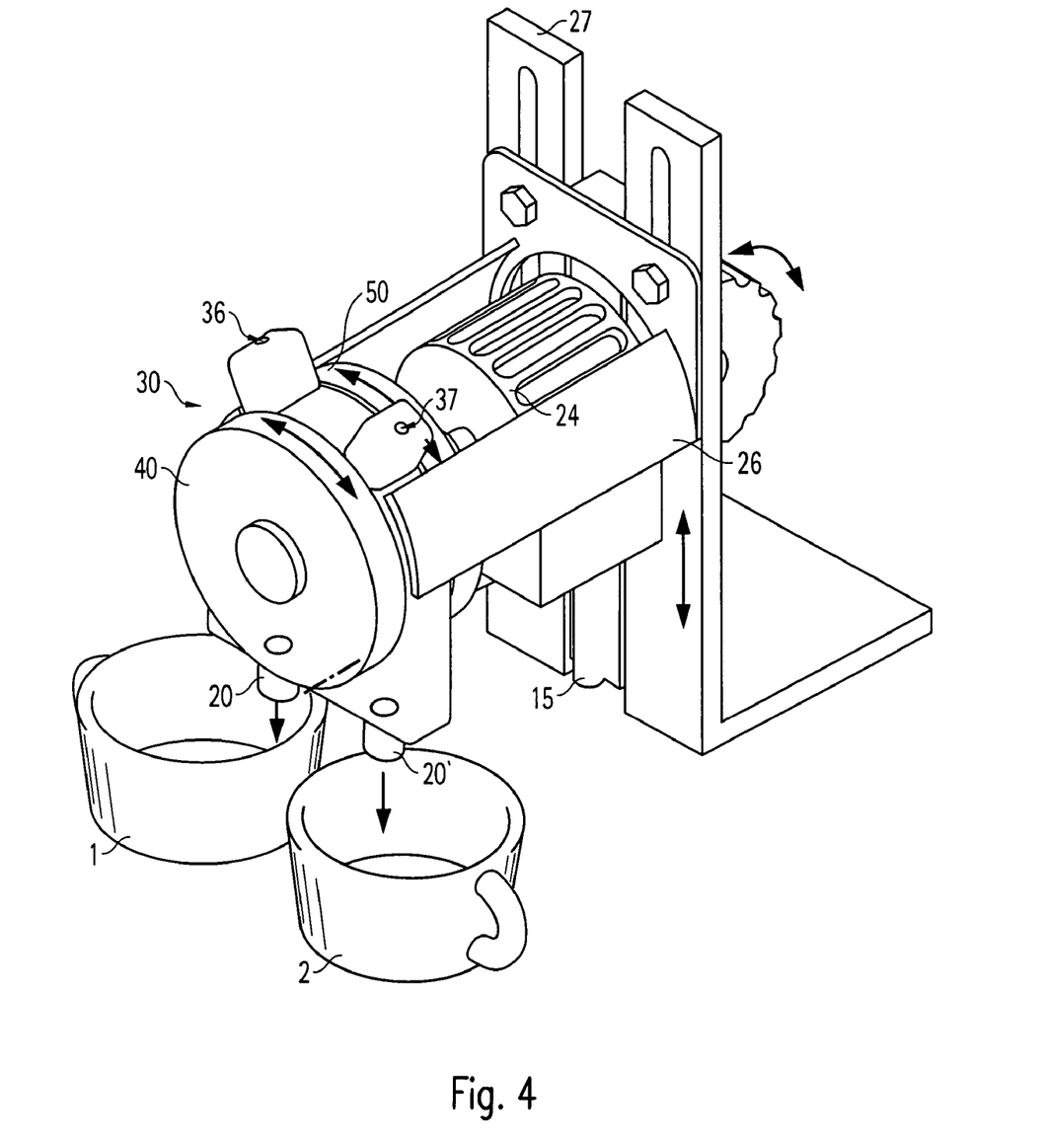
FIG. 4 is a perspective drawing of the arrangement according to FIGS. 1 to 3.

Also connected to the outflow block 31 is a drainage pipeline 15 connected to a waste-water channel, so that accessory fluid (e.g., a flushing agent) flowing through the pipelines and channels illustrated and described here can be removed, without passing through the filling outlets 20, 20'. The basic construction just described is shown again, in perspective, in FIG. 4.

In the following, the function of the valve means 30 during dispensing and cleaning cycles is summarily described for the types of drinks described here, namely coffee and milk, with reference to FIGS. 5 to 16; a more detailed description is given subsequently. In FIGS. 5 to 7 and 11 to 13 are shown the channels that are disposed in the first rotary disk 40 and can be connected to the first inlet 36, whereas FIGS. 8 to 10 and 14 to 16 show the channels disposed in the second rotary disk 50 and connectable to the second inlet 37, in each case indicated by dashed lines. Channels provided in the outflow block 31 appear in all FIGS. 5 to 16 (solid lines).

Figure 5:
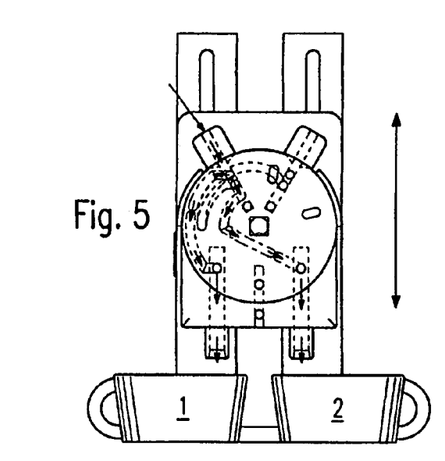
FIG. 5 is a front view in which is indicated the arrangement of the channels for "coffee dispensing double"
Figure 11:
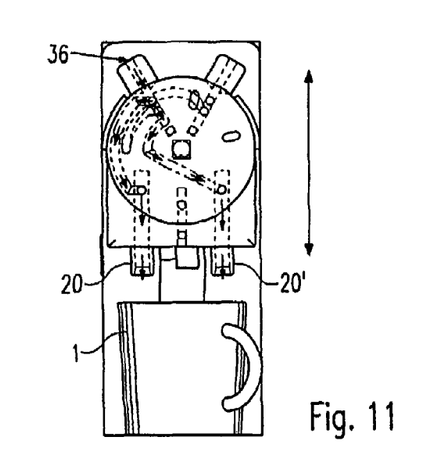
FIG. 11 is a view corresponding to FIG. 5 for "coffee dispensing double (one cup)"

FIGS. 5 and 11 represent the process of dispensing a "coffee double", in which coffee flows into the first inlet 36 and through the two filling outlets 20, 20', into a container 1, 2.

Figure 6:
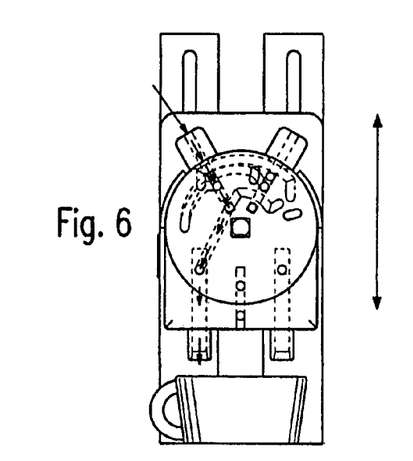
FIG. 6 is a view corresponding to FIG. 5 for "coffee dispensing single"
Figure 12:
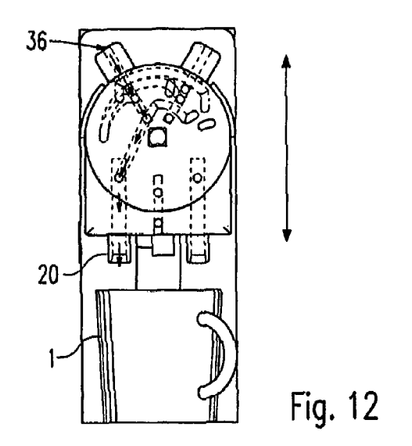
FIG. 12 is a view corresponding to FIG. 5 for "coffee dispensing single (one cup)"

FIGS. 6 and 12 illustrate the case in which coffee flows into the first inlet 36 and enters the container 1 through only one filling outlet 20.

Figure 7:
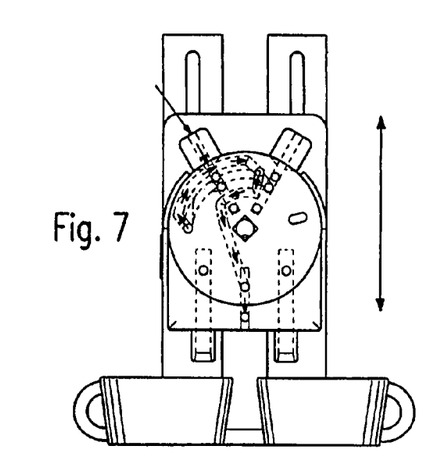
FIG. 7 is a view corresponding to FIG. 5 for "rinsing coffee side"
Figure 13:
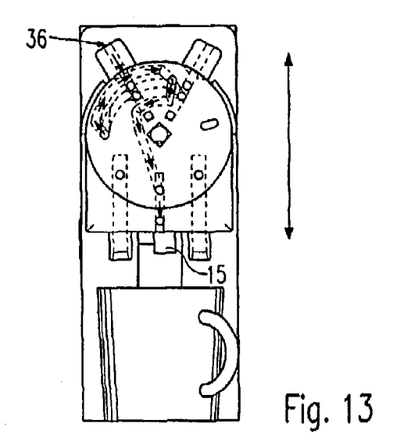
FIG. 13 is a view corresponding to FIG. 5 for "rinsing coffee side"
Figure 14:
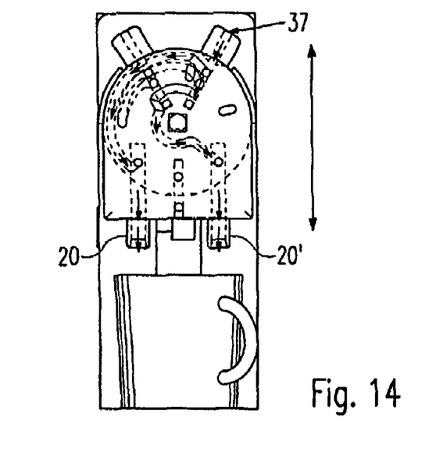
FIG. 14 is a view corresponding to FIG. 5 for "milk dispensing double"

In FIGS. 7 and 13 is shown the case in which, instead of coffee, hot water and/or a flushing agent enters the first inlet 36 (with valve 7 closed and valve 13 opened) and then, after flowing through the channels shown as dispensing coffee in FIGS. 11 and 12, is carried away in the drainage pipeline 15.

Figure 8:
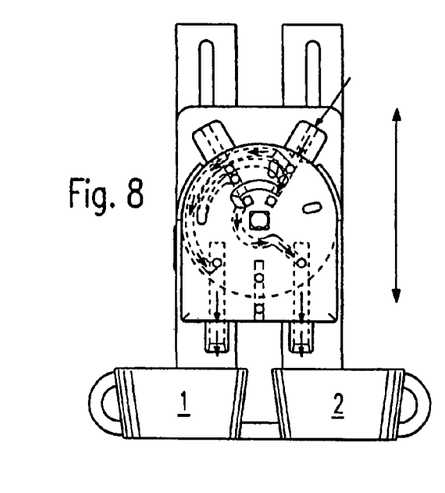
FIG. 8 is a view corresponding to FIG. 5 for "milk dispensing double"
Figure 9:
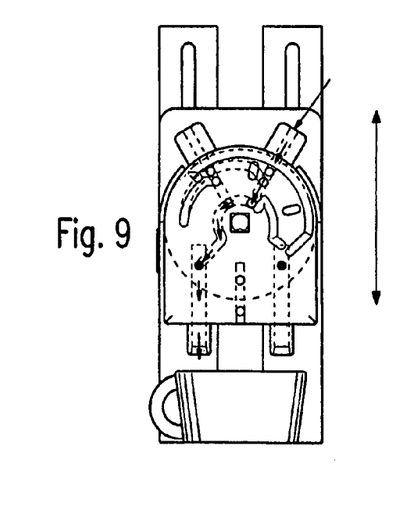
FIG. 9 is a view corresponding to FIG. 5 for "milk dispensing single"
Figure 10:
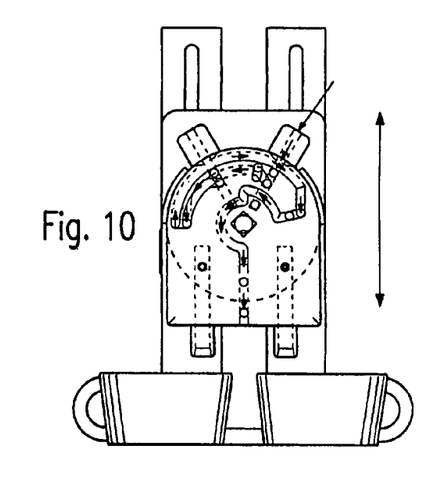
FIG. 10 is a view corresponding to FIG. 5 for "rinsing milk side"

Similarly, FIGS. 8, 9 and 10, as well as 14, 15 and 16, illustrate the dispensing of milk, which enters through the second inlet 37 and passes through a filling outlet 20 or two filling outlets 20, 20', as well as the rinsing of channels that had previously contained milk by a flushing agent, which (with valve 8 closed and valve 14 opened) flows through the second inlet 37 and is carried away in the drainage pipeline 15.

In the following, with reference to FIGS. 17 to 20, the function "coffee double" mentioned with reference to FIG. 11 is explained in greater detail. At this juncture it should be pointed out that FIGS. 17 to 40 always show only the outflow block 31 and one of the rotary disks 40 or 50, depending on which of them is necessary for the function being described.

As shown in FIGS. 17 to 20, the first disk 40 is closely apposed to one vertical surface of the outflow block 31 and is seated on the shaft 25, so that it can be rotated by the motor 24. On the block surface that faces the first disk 40 are situated channels 32 (first channel) and 33 (second channel), each of which opens into the first disk 40. In the surface of the first disk 40 that faces the outflow block 31 a first channel 41 and a second channel 42 are inserted. The first inlet 36 attached to the outflow block 31 is opened by way of bores to the vertical surface of the outflow block 31 that faces toward the first disk 40.

The filling outlets 20, 20' attached to the outflow block 31, i.e. their first flow channels 21, are likewise in communication, by way of bores, with the surface of the outflow block 31 that faces toward the first disk 40.

The drainage pipeline 15, which is also disposed in the outflow block 31, communicates by way of bores (which are especially clearly illustrated in FIG. 19) with both vertical surfaces of the outflow block 31.

In the functional setting "coffee double" shown in FIGS. 17 to 20, coffee flows through the first inlet 36 and the bores provided in the outflow block 31 to the surface of the outflow block 31 and from there, when the first disk 40 is in the rotational position shown in the figures, enters the first channel 41 as well as, in parallel thereto, the second channel 42 in the first disk 40. From these channels the coffee flows into the first channels 21 of the filling outlets 20, 20' and on into the cups 1, 2 positioned below them. Hence this function corresponds to that shown in FIG. 11.

In FIGS. 21 to 24 is shown the analogous function "milk double", in which milk is put into the two cups 1, 2. For this purpose the second rotary disk 50, which is positioned opposite to the first disk 40 on the other vertical surface of the outflow block 31, comprises a first channel 51 and a second channel 52, which are open toward the surface of the outflow block 31. Corresponding channels that are open toward the second disk 50 are provided in the outflow block 31, namely channels 34 (third channel) and 35 (fourth channel); the third channel 34 communicates at its end with the second inlet 37.

The second flow channels 22 of the filling outlets 20, 20', which are disposed in the outflow block 31, are open by way of bores to the surface of the outflow block 31 to which the second disk 50 is apposed.

In the functional setting "milk double" the milk passes through the second inlet 37, the channels 51 and 52 (parallel) and the second flow channels 22 into the cups 1, 2. This functional setting thus corresponds to that shown in FIG. 14.

In the functional setting "coffee single" shown in FIGS. 25 to 28, which corresponds to FIG. 12, the coffee passes from the first inlet 36 through a section of the second channel 42 in the first disk 40 until it reaches the first flow channel 21 of the filling outlet 20, through which it flows into the cup 1 positioned under the outlet.

Figure 15:
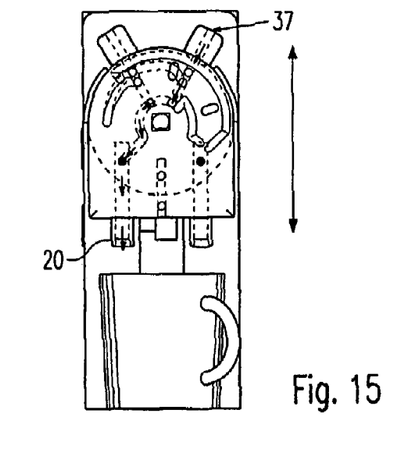
FIG. 15 is a view corresponding to FIG. 5 for "milk dispensing single"
Figure 16:
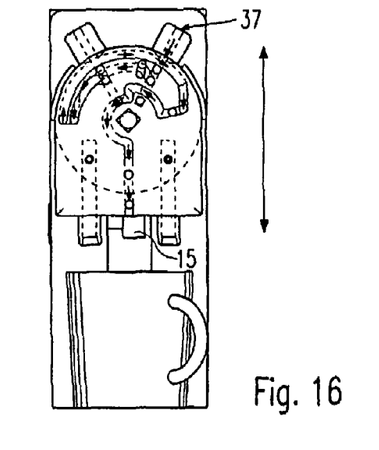
FIG. 16 is a view corresponding to FIG. 5 for "rinsing milk side"
Figures 17, 20:
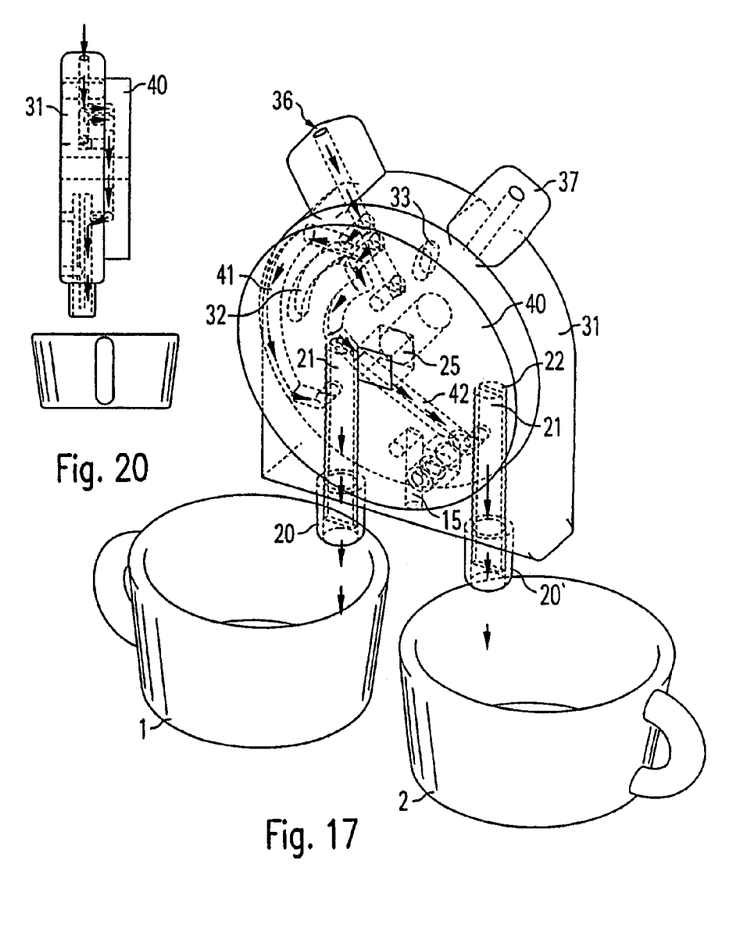
FIG. 17 is a perspective view indicating channels for "dispensing coffee double"
FIG. 20 is a schematic side view similar to FIG. 19, in which the channels are represented.
Figure 18:
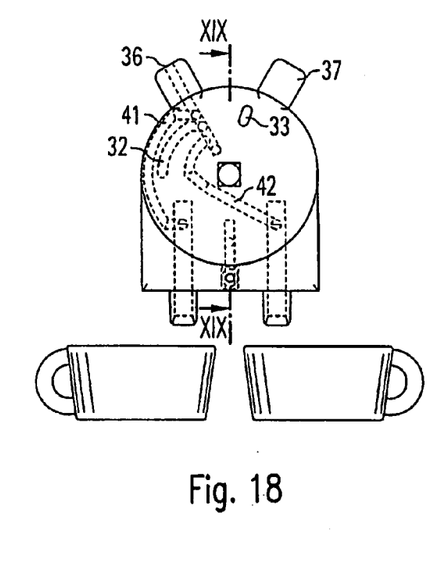
FIG. 18 is a view corresponding to FIG. 5 for "dispensing coffee double"
Figure 19:
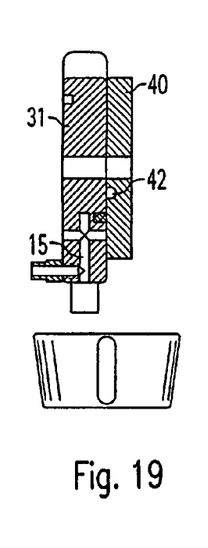
FIG. 19 is a sectional view of the arrangement according to FIG. 18 along the line XIX-XIX in FIG. 18.
Figures 21, 24:
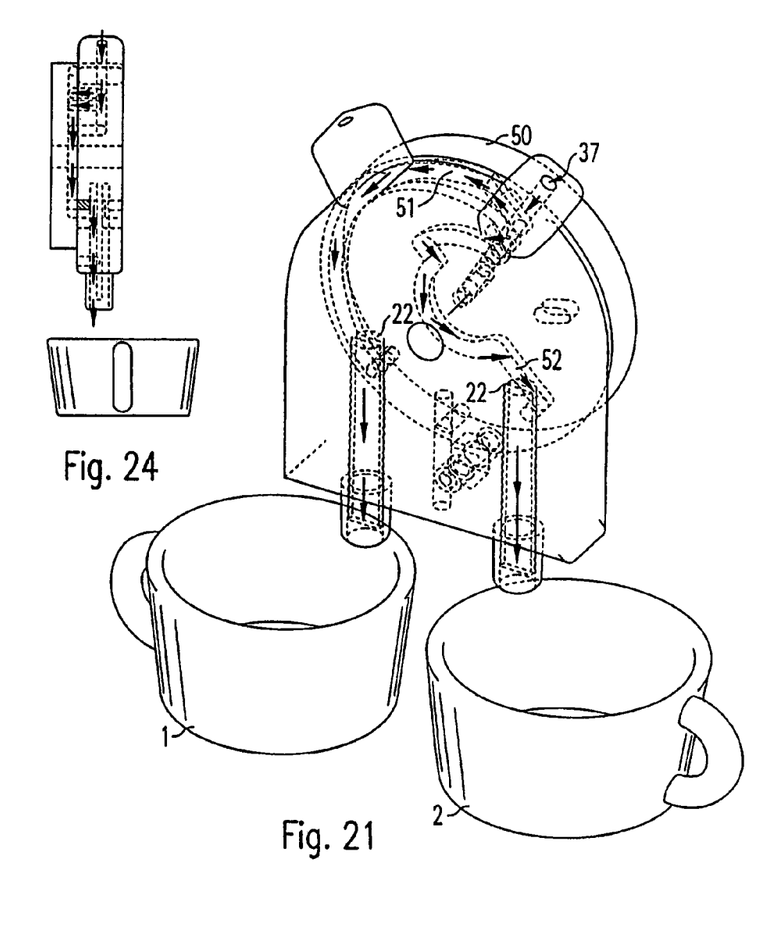
FIG. 21 is a perspective drawing according to FIG. 17 for "dispensing milk double"
FIG. 24 is a drawing corresponding to FIG. 20 for the arrangement according to FIG. 21.
Figure 22:
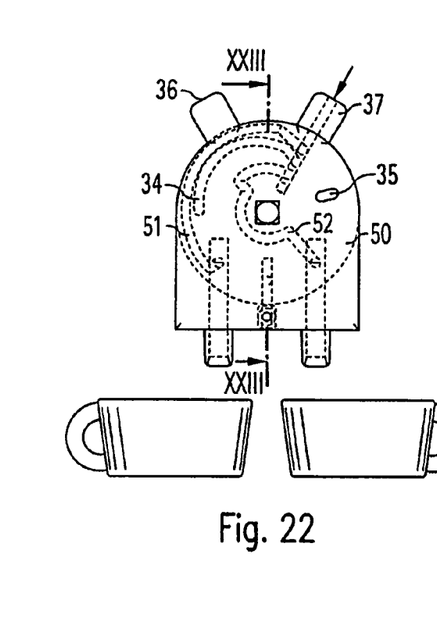
FIG. 22 is a drawing corresponding to FIG. 18 for the function according to FIG. 21.
Figure 23:
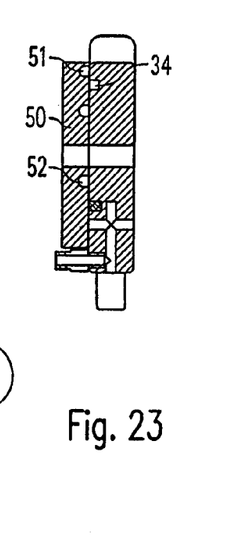
FIG. 23 is a sectional drawing along the line XXIII-XXIII in FIG. 22.
Figures 25, 28:
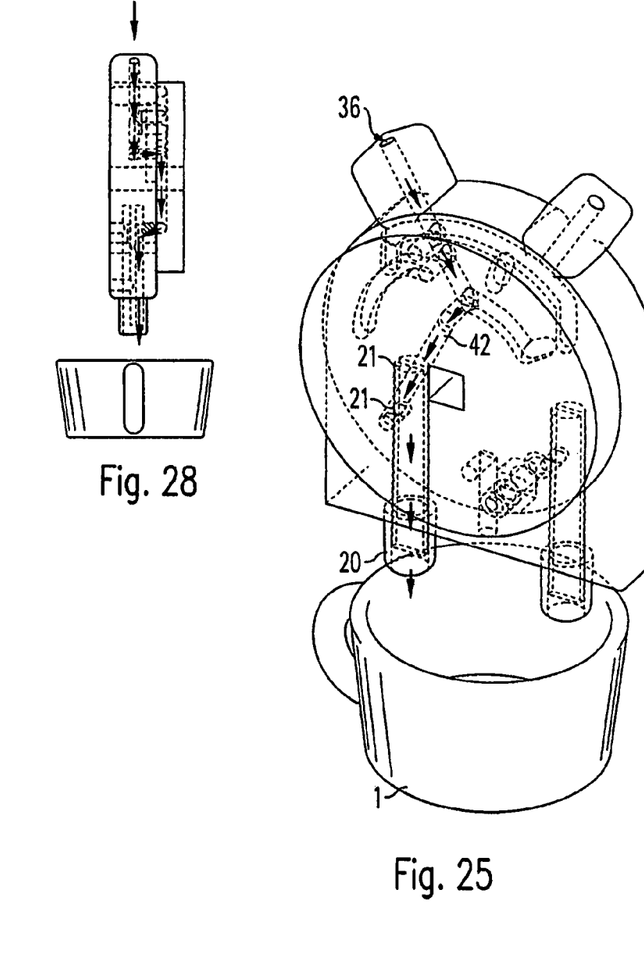
FIG. 25 is a drawing according to FIG. 17 for "dispensing coffee single"
FIG. 28 is a drawing corresponding to FIG. 20 for the arrangement according to FIG. 25.
Figure 26:
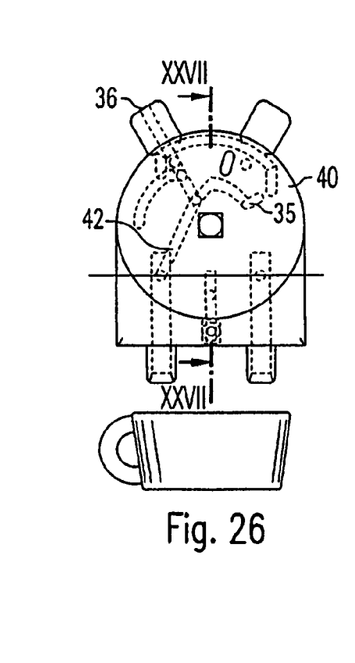
FIG. 26 is a drawing corresponding to FIG. 18 for the arrangement according to FIG. 25.
Figure 27:
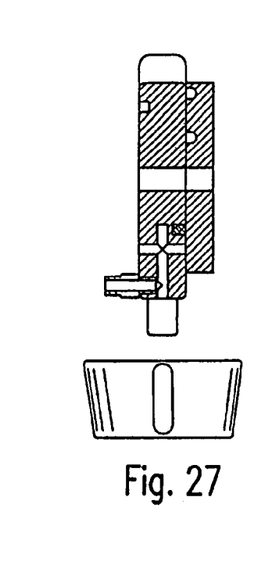
FIG. 27 is a sectional drawing along the line XXVII-XXVII in FIG. 26.
Figure 29:
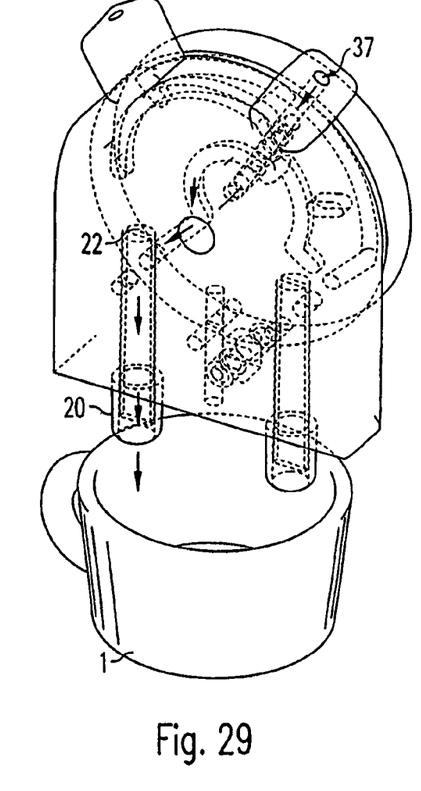
FIG. 29 is a drawing corresponding to FIG. 17 for "dispensing milk single"
Figure 30:
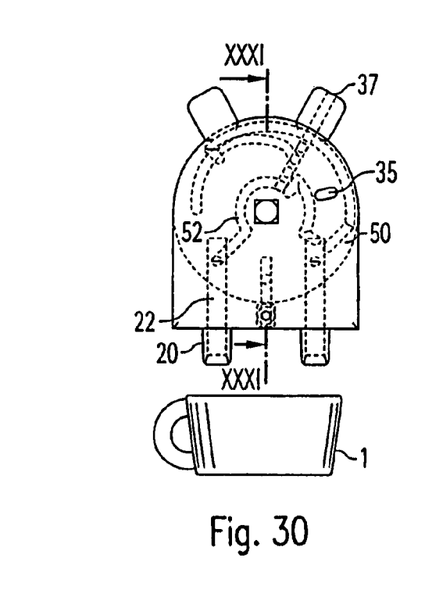
FIG. 30 is a drawing corresponding to FIG. 18 for the arrangement according to FIG. 29.
Figure 31:
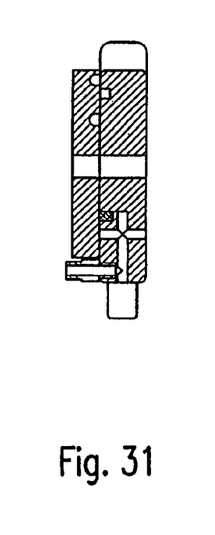
FIG. 31 is a section along the line XXXI-XXXI in FIG. 30.
Figure 32:
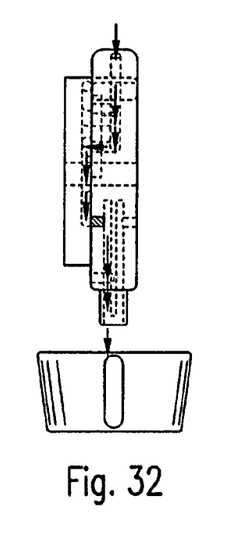
FIG. 32 is a drawing corresponding to FIG. 20 for the arrangement according to FIG. 29.
Figures 33, 34, 35, 36:
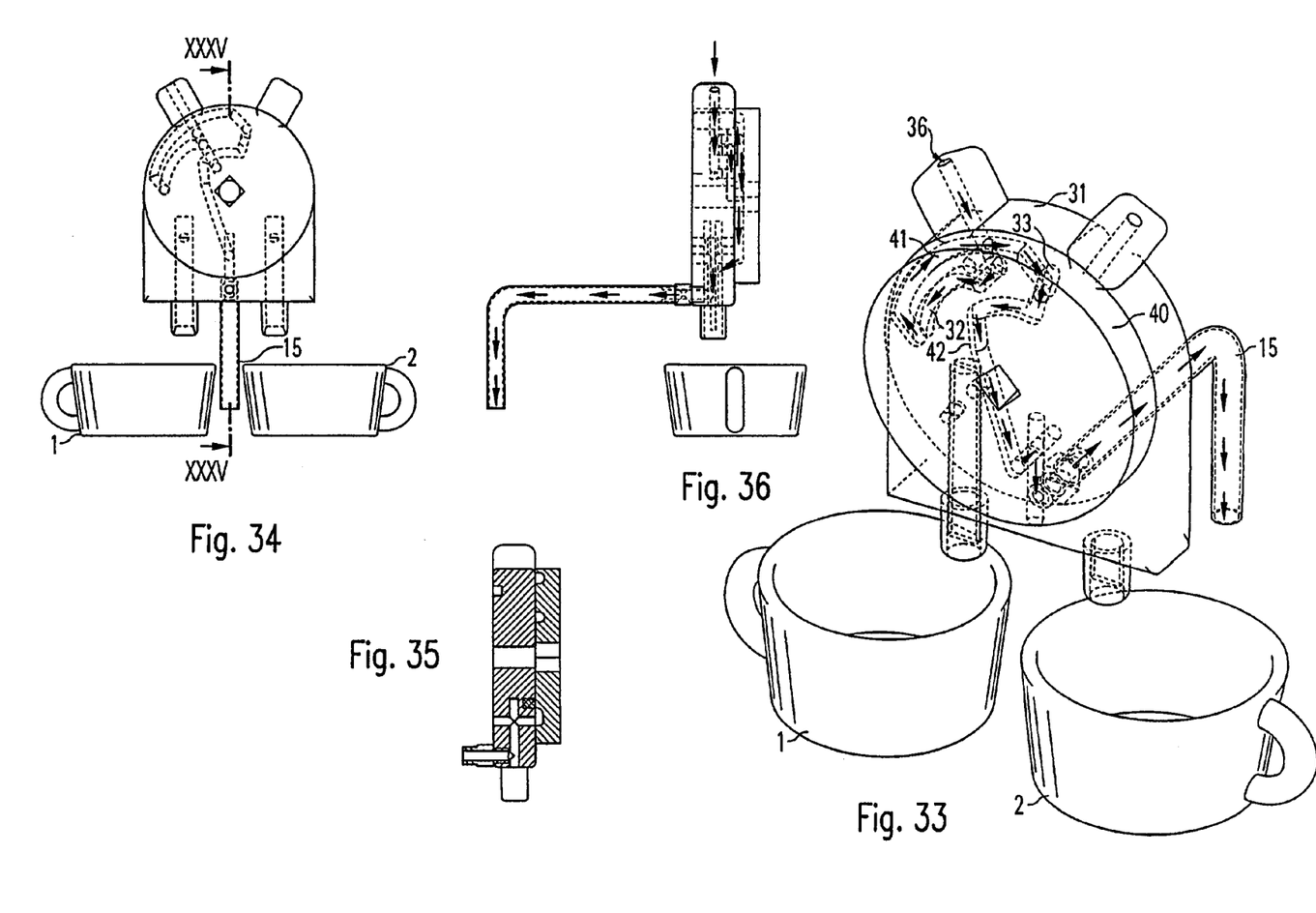
FIG. 33 is a drawing corresponding to FIG. 17 for "rinsing coffee side"
FIG. 34 is a drawing corresponding to FIG. 18 for the arrangement according to FIG. 33.
FIG. 35 is a section along the line XXXV-XXXV in FIG. 34.
FIG. 36 is a drawing corresponding to FIG. 20 for the arrangement according to FIG. 33.
Figures 37, 38, 39, 40:
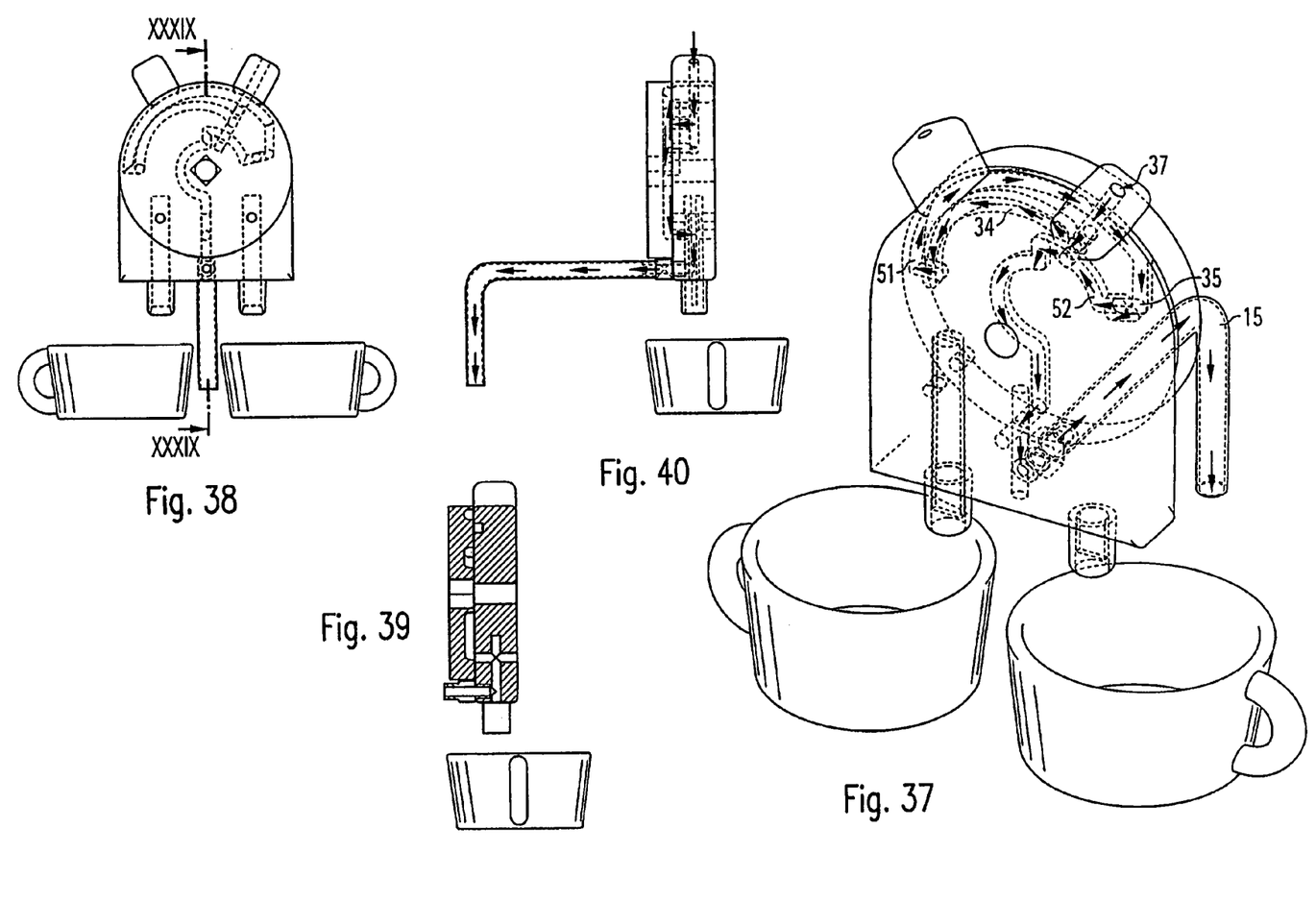
FIG. 37 is a drawing corresponding to FIG. 17 for the function "rinsing milk side"
FIG. 38 is a drawing corresponding to FIG. 18 for the arrangement according to FIG. 37.
FIG. 39 is a section along the line XXXIX-XXXIX in FIG. 38.
FIG. 40 is a drawing corresponding to FIG. 20 for the arrangement according to FIG. 37.

FIGS. 29 to 32 show the analogous functional setting corresponding to FIG. 15, i.e. the functional setting "milk single", in which milk flows through the second inlet 37, a section of the second channel 52 in the second disk 50 and the second flow channel 22 of the filling outlet 20, before entering the cup 1.

In the following, the functional setting "rinsing coffee" (corresponding to FIG. 13) is explained with reference to FIGS. 33 to 36.

In this functional setting the valve 7 is closed and the valve 13 is opened, so that the accessory-fluid supply 10 is in communication with the first inlet 36 in the outflow block 31 by way of the first supplementary pipeline 11 and the drink pipeline 9. From the first inlet 36, the cleaning fluid flows through the first channel 32 in the outflow block 31 into one end of the first channel 41 in the first rotary disk 40 and on through that channel; emerging from its other end, it enters the second channel 33 in the outflow block 31 and passes from there into the first end of the second channel 42 in the first disk 40 and out of its second end into the drainage pipeline 15, through the associated bores in the outflow block 31. In this way all of the channels that come into contact with coffee while that drink is being dispensed are rinsed with cleaning fluid.

For this purpose the controller 3 is designed so that after every drink has been dispensed (e.g. FIG. 11 or FIG. 12) cleaning (FIG. 13; FIGS. 33 to 36) of the relevant channels occurs before a new dispensing process is initiated.

In the function illustrated in FIGS. 16 and 37 to 40, namely "rinsing milk", the channels through which milk has previously flowed (FIG. 14 or 15) are rinsed in an analogous manner. With valve 8 closed and valve 14 opened, therefore, the cleaning fluid flows into the second inlet 37 and from there into one end of the channel 34 in the outflow block 31, out of its other end into one end of the first channel 51 in the second rotary disk 50, out of its second end through the fourth channel 35 in the outflow block and into the first end of the second channel 52 in the second disk 50, and finally through its second end into the bores of the drainage pipeline 15, to be discarded. Here, again, the cleaning fluid passes through all of the channels through which milk had previously flowed (see FIGS. 14 and 21 to 24 as well as FIGS. 15 and 29 to 32).

Figure 41:
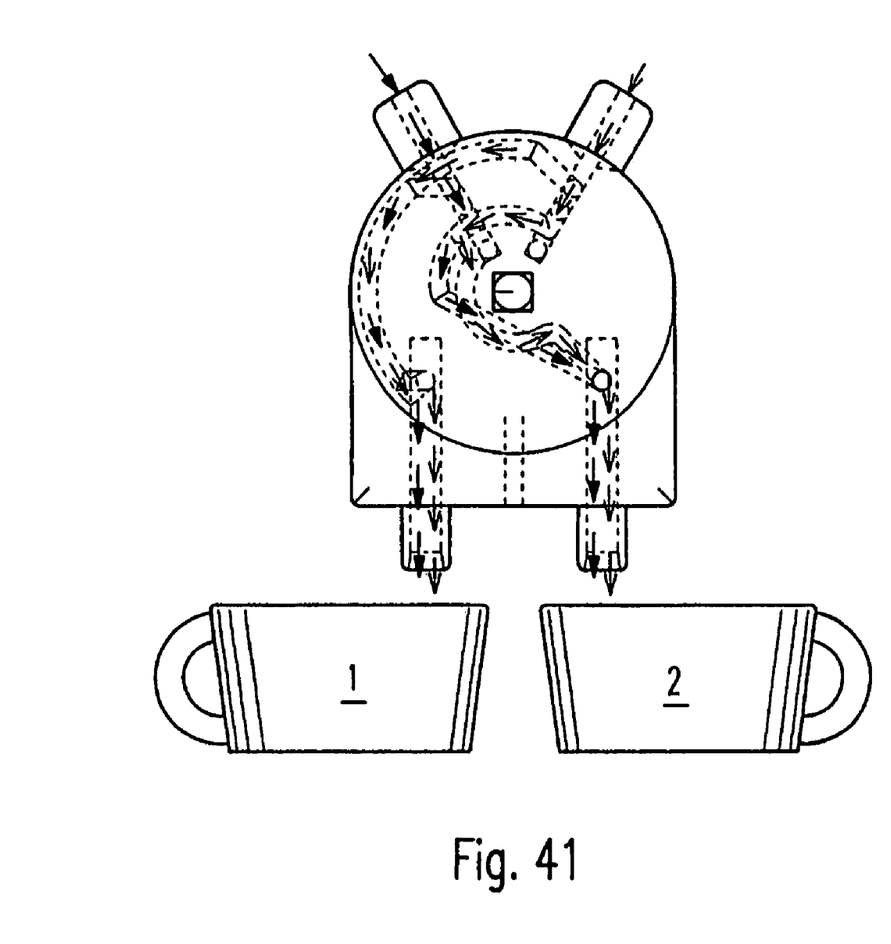
FIG. 41 is a drawing corresponding to FIG. 18 for the function "simultaneous dispensing of milk and coffee"
Figure 42:
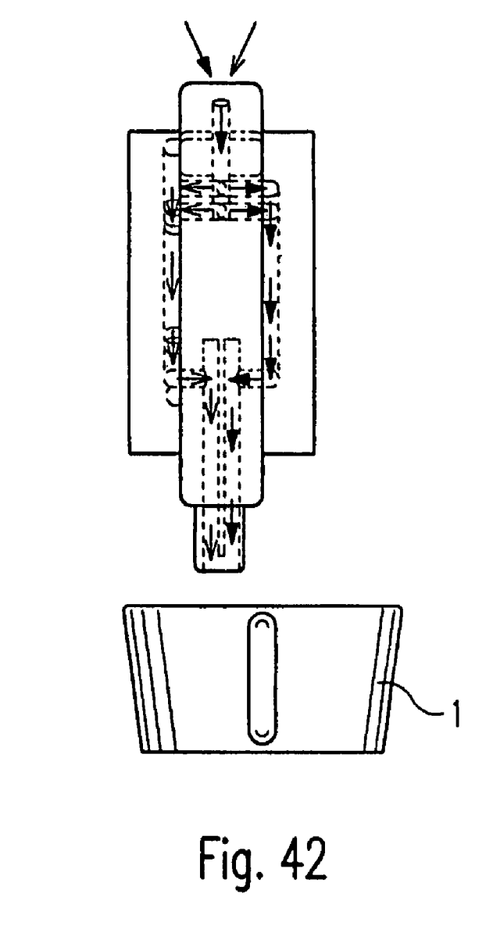
FIG. 42 is a drawing corresponding to FIG. 20 for the arrangement according to FIG. 41.

Finally, FIGS. 41 and 42 show how the rotary disks 40 and 50 are positioned, i.e. the channels are arranged, in order to fill containers 1, 2 with coffee and milk simultaneously. The positions here correspond to a combination of the positions shown in FIGS. 11 and 14 as well as 17 to 20 and 21 to 24, with the difference that the first inlet 36 is supplied with coffee and at the same time the second inlet 37 is supplied with milk, by opening the valves 7 and 8 (while valves 13 and 14 are closed). The associated rinsing process corresponds to a combination of the previously illustrated rinsing processes according to FIGS. 13 and 16 as well as 33 to 36 and 37 to 40.

It can be seen from the above that in the embodiment presented here the two rotary disks 40 and 50 can be rigidly connected to one another. Of course it is also possible to control the two disks 40 and 50 separately from one another, so that still other valve routes or channels can be provided in the disks.

In addition to the rinsing process after every drink-dispensing procedure (or after a larger group of dispensing procedures), in which all the channels through which drinks had previously flowed are rinsed without dead zones, so to speak, it is also possible to take the arrangement apart completely with relatively few manipulations, in order to gain access to the channels that open to the exterior. However, this is in general not necessary, because the rinsing encompasses all the regions through which foodstuffs flow.

LIST OF REFERENCE NUMERALS

1 Container
2 Container
3 Controller
4 Keyboard
1st supply means
6 2nd supply means
7 1st valve
8 2nd valve
9 Drink pipeline
10 Supplementary-fluid supply
11 1st supplementary pipeline
12 2nd supplementary pipeline
13 1st supplementary valve
14 2nd supplementary valve
15 Drainage pipeline
20, 20' Filling outlet
21 1st flow channel
22 2nd flow channel
24 Motor
25 Shaft
26 Valve holder
27 Stand
28 Vertical drive
30 Valve means
31 Outflow block
32 1st channel
33 2nd channel
34 3rd channel
35 4th channel
36 1st inlet
37 2nd inlet
40 1st rotary disk
41 1st channel
42 2nd channel
50 2nd rotary disk
51 1st channel
52 2nd channel

The invention claimed is:

1. Dispensing device for drinks or similar dosable liquid foodstuffs comprising
    supply means adapted to supply at least two different drinks;
    filling outlets adapted to dispense a drink into at least one container;
    drink pipelines connecting the supply means to the filling outlets;
    accessory pipelines for supplying and carrying away an accessory fluid from an accessory fluid supply, in the form of at least one of flushing agents for cleaning, hot water or steam for prewarming, or other similar fluid; and
    valve means for closing and opening said drink pipelines between the supply means and the filling outlets and adapted to open said accessory pipelines to the valve means instead of the drink pipelines in order to treat the valve means in the regions through which the drinks flow;
    wherein the valve means comprises at least one movable element and a motor for moving said movable element, and defines at least two channels each of which in a first position of said movable element is assigned to at least one particular mode of operation for dispensing the drink, and in a second position of said movable element is connected to the accessory pipelines.

2. Dispensing device according to claim 1, wherein the movable element is constructed as a rotary disk.

3. Dispensing device according to claim 1, wherein the filling outlets are mounted directly adjacent to said movable element.

4. Dispensing device according to claim 1, wherein at least two of said movable elements are provided and each defines channels such that two or more drinks can be supplied to the same filling outlets either simultaneously or sequentially, as desired.

5. Dispensing device according to claim 1, wherein said channels can be connected to one another in such a way that said accessory fluid can flow through several channels simultaneously.

6. Dispensing device for drinks or similar dosable liquid foodstuffs comprising:
    supply means adapted to supply at least two different drinks;
    filling outlets adapted to dispense a drink into at least one container;
    drink pipelines connecting the supply means to the filling outlets;
    accessory pipelines for supplying and carrying away an accessory fluid from an accessory fluid supply, in the form of at least one of flushing agents for cleaning, hot water or steam for prewarming, or other similar fluid; and
    valve means for closing and opening said drink pipelines between the supply means and the filling outlets and adapted to open said accessory pipelines to the valve means instead of the drink pipelines in order to treat the valve means in the regions through which the drinks flow;
    wherein one of said accessory pipelines is provided to carry away said accessory fluid, which can be passed through said drink pipelines, and means being provided to block off said drink pipelines at a site directly ahead, in the flow direction, of inflow openings provided for the accessory fluid.

* * * * *